(Model.)

T. H. McCRAY.
DRIVE CHAIN.

No. 403,128. Patented May 14, 1889.

Witnesses:

Inventor:
Thomas H. McCray,
By Charles J. Brown,
Atty

UNITED STATES PATENT OFFICE.

THOMAS H. McCRAY, OF CHICAGO, ILLINOIS, ASSIGNOR OF ONE-HALF TO ALEXANDER H. GUNN, OF SAME PLACE.

DRIVE-CHAIN.

SPECIFICATION forming part of Letters Patent No. 403,128, dated May 14, 1889.

Application filed September 3, 1888. Serial No. 284,396. (Model.)

*To all whom it may concern:*

Be it known that I, THOMAS H. MCCRAY, a citizen of the United States, residing at Chicago, in the county of Cook and State of Illinois, have invented certain new and useful Improvements in Link Belts or Drive-Chains, of which the following is a full and complete description.

My invention relates to that class of link belts composed of detachable metal links; and I am aware that there are now in use belts of this kind having links of different kinds and styles. I do not therefore claim, broadly, link belts or drive-chain links; but, so far as I am aware, links of the character herein described are new, and I claim as my invention the several devices herein shown, described, and claimed.

I have illustrated my invention by the drawings accompanying and forming a part of this specification, in which—

Figure 1:
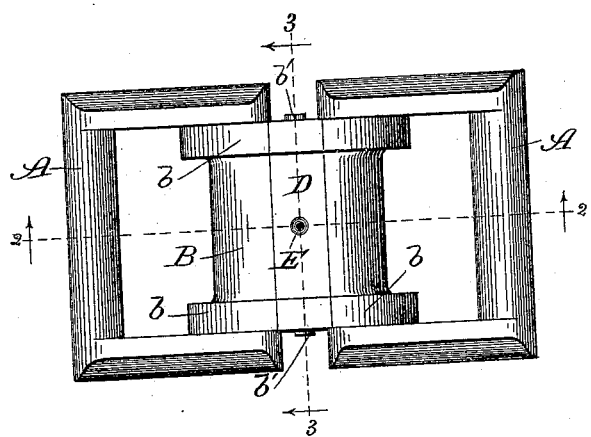
Figure 2:
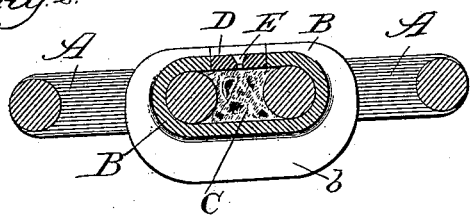
Figure 3:
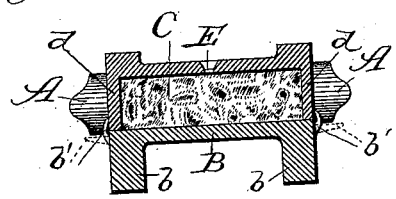

Figure 1 is a plan view of my invention. Fig. 2 is a cross-section on line 2 2 of Fig. 1, and Fig. 3 is a cross-section on line 3 3 of Fig. 1.

Like letters refer to like parts throughout the several views.

A A are rectangular links, which may be constructed of cast or wrought metal, as preferred.

B is a link formed of a double hook, having an opening between the ends of the two hooks, upon one side of said link, sufficiently large to admit the insertion therein of the end bars of link A.

C is a stuffing or filling of porous material, as cotton or oakum, adapted to act as an absorbent or vehicle for oil or other lubricating compound or liquid.

D is a lock closing the aperture through which the end bars of links A A are inserted in link B. Lock D has flanges or ears $d\ d$ thereon, at right angles, or nearly so, to the main body or part of the lock D. Ears $d\ d$ extend to the main part of hook-link B B, and there is formed by the said lock D a receptacle within which porous material, C, suitably saturated with lubricating material, may be placed.

$b\ b$ are flanges on link B.

$b'\ b'$ are brackets of soft metal cast or formed in the shape shown by the dotted lines in Fig. 3 on link B.

E is an ordinary oil-hole, through which oil may be poured upon porous material, C.

The manner in which a link belt is constructed when composed of my improved links is as follows: The end bars of rectangular links A A are inserted in hook-link B. Porous material, C, suitably saturated with lubricating material, is placed in the space formed in lock D by the flanges $d\ d$ thereon, and the lock D, together with the lubricating material, is slid into place. Brackets $b'\ b'$ are then turned upward by a hammer, ordinarily into about the position illustrated in Figs. 1 and 3. Oil or other liquid lubricants may be at any time inserted through hole E on porous material, C.

The purpose of my invention is to secure a drive-chain adapted to be used for various purposes, in which, on account of the rapid wear arising from the particles of dirt, grit, and the like present, the drive-chains now and heretofore made are not suitable; and by this construction, whereby I am enabled to use a lubricant for lessening the friction in that part of the chain most subject to wear, I obtain a drive-chain having much better wearing capabilities for ordinary usage than the drive-chains now used.

In application No. 284,395, for patent for drive-chain, filed by me on the day of the filing of this application, I describe and illustrate the herein-claimed lock, having ears or projections on the ends thereof, by means of which, in combination with the links forming the drive-chain, I obtain a closed receptacle or chamber suitable for the placing therein of a lubricant; but I do not claim in the said application that the said lock forms a material part of the said invention described and claimed in said application No. 284,395.

Having thus described my invention and its construction, what I claim, and desire to secure by Letters Patent, is—

1. In a drive-chain, the combination of a link having a hook at each end thereof, a lock having ears or projections at the ends thereof, rectangular links having end bars fitting into said hooked link, the said lock fitting into said hooked link and holding said rectangular links in position by the ears or projections thereon, the body of said lock forming the top, the ears thereon the ends, the end bars of said rectangular links the sides, and the portion of said hooked link between said end bars the bottom of a closed chamber suitable for the placing therein of lubricating material, substantially as described.

2. In a drive-chain, the combination of a link having a hook at each end thereof, a rectangular link having end bars fitting into said hooked link, a lock having ears thereon adapted to form a lock holding said rectangular links in place, and a receptacle in said hooked link and between the end bars of said rectangular link, and porous material, as oakum, placed in said receptacle and adapted to have placed thereon lubricating material, all substantially as described.

THOMAS H. McCRAY.

Witnesses:
ALEX. H. GUNN,
CHARLES T. BROWN.